US009917962B1

United States Patent
Kodimer

(10) Patent No.: US 9,917,962 B1
(45) Date of Patent: Mar. 13, 2018

(54) MULTIFUNCTION PERIPHERAL WITH AVATAR BASED LOGIN

(71) Applicants: Kabushiki Kaisha Toshiba, Minato-ku (JP); Toshiba TEC Kabushiki Kaisha, Shinagawa-ku (JP)

(72) Inventor: Marianne Kodimer, Huntington Beach, CA (US)

(73) Assignees: Kabushiki Kaisha Toshiba, Minato-ku (JP); Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 15/455,388

(22) Filed: Mar. 10, 2017

Related U.S. Application Data

(60) Provisional application No. 62/410,518, filed on Oct. 20, 2016.

(51) Int. Cl.
| | |
|---|---|
| *G06K 15/00* | (2006.01) |
| *H04N 1/00* | (2006.01) |
| *H04N 1/44* | (2006.01) |
| *H04N 1/32* | (2006.01) |
| *G06F 3/0488* | (2013.01) |
| *G06F 3/0481* | (2013.01) |

(52) U.S. Cl.
CPC ..... *H04N 1/00411* (2013.01); *H04N 1/00392* (2013.01); *H04N 1/00514* (2013.01); *H04N 1/32101* (2013.01); *H04N 1/4413* (2013.01); *H04N 1/4433* (2013.01); *G06F 3/04817* (2013.01); *G06F 3/04883* (2013.01); *H04N 2201/0094* (2013.01)

(58) Field of Classification Search
USPC ........................................... 358/1.14
See application file for complete search history.

(56) References Cited

U.S. PATENT DOCUMENTS

| | | | | |
|---|---|---|---|---|
| 2010/0031261 | A1* | 2/2010 | Morita | H04N 1/00222 718/100 |
| 2010/0146608 | A1* | 6/2010 | Batie | G06F 21/32 726/7 |
| 2012/0167235 | A1* | 6/2012 | Donfried | G06Q 10/105 726/29 |
| 2014/0160149 | A1* | 6/2014 | Blackstock | G06N 3/006 345/619 |
| 2017/0031540 | A1* | 2/2017 | Xiangli | G06F 21/31 |

* cited by examiner

*Primary Examiner* — Moustapha Diaby
(74) *Attorney, Agent, or Firm* — Ulmer & Berne LLP

(57) ABSTRACT

A system and method for logging into a document processing includes a touchscreen for receiving touch-based user input and displaying digital images. A memory stores avatar data for each of a plurality of avatars, including image data for generating an image of each avatar on the touchscreen and a plurality of identifiable areas within each avatar. A login screen on the touchscreen includes images of the avatars. A user selects an avatar and the login screen displays an image of the selected avatar on the touchscreen. The user touches the touchscreen, and tap point data is captured corresponding to the user touches on the image of the selected avatar relative to a touchscreen location of the avatar. The processor compares received tap point data with stored tap point data stored in the memory associatively with the selected avatar and selectively enables device operation in accordance with the comparison.

20 Claims, 11 Drawing Sheets

MULTIFUNCTION PERIPHERAL WITH AVATAR BASED LOGIN

CROSS-REFERENCE TO RELATED APPLICATIONS

This application claims the benefit of U.S. Provisional Application No. 62/410,518, filed Oct. 20, 2016, which is incorporated herein by reference.

TECHNICAL FIELD

This application relates generally to a system and method for document processing device user login. The application relates more particularly to a system and method for avatar based user login to multifunction peripherals.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Users may send document processing jobs, such as a print request, to one or more networked MFP devices. In a typical shared device setting, one or more workstations are connected via a network. When a user wants to print a document, an electronic copy of that document is sent to a document processing device via the network. The user may select a particular device when several are available. The user then walks to the selected device and picks up their job or waits for the printed document to be output. If multiple users send their requests to the same device, the jobs are queued and outputted sequentially.

In certain situations, a user may not wish their printout to be sitting at the MFP waiting for pickup insofar as private document content could be available for anyone to see prior to being picked up by the sending user. In a private printing operation, the user is required to login at the MFP before their job will be released for printing. It may be desirable to have a user login to an MFP for many other reasons, such as limiting device availability to employees, or to a limited group of employees, such as the accounting department. Login may also be used to control which MFP operations are available to a particular user. For example, some users may be precluded from making color printouts or color copies given increased expense in doing so. Login may also be used to track MFP usage by individual, department, location, etc. Login may also allow for accounting functions, such as usage charges, to be assessed appropriately.

Login is typically accomplished with entry of a username and password at an MFP user interface. MFP user interface devices often include touchscreen displays. When a user wishes to login, a rendering of a virtual keyboard on the touchscreen allows the user to type in the appropriate username and password. An example rendering of such a virtual keyboard is illustrated by display 100 of FIG. 1 such as may appear on a MFP touchscreen.

SUMMARY

In accordance with an example embodiment of the subject application, a system and method for logging into a document processing system includes a touchscreen for receiving touch-based user input and display digital images in accordance with operation of a processor included in a device controller processor. A memory stores avatar data for each of a plurality of avatars with each avatar including image data configured to generate an image of an avatar on the touchscreen including a plurality of identifiable areas within the avatar. The processor generates a login screen on the touchscreen including images of a plurality of avatars from stored avatar data retrieved from memory. The processor receives user selection data corresponding to a user-selected avatar and generates a login image of the selected avatar on the touchscreen. The processor receives, from the touchscreen, tap point data corresponding to a plurality of user touches on the image of the selected avatar relative to a touchscreen location of the avatar. The processor compares received tap point data with stored tap point data stored in the memory associatively with the selected avatar and selectively enables device operation in accordance with the comparison.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Figure 1:
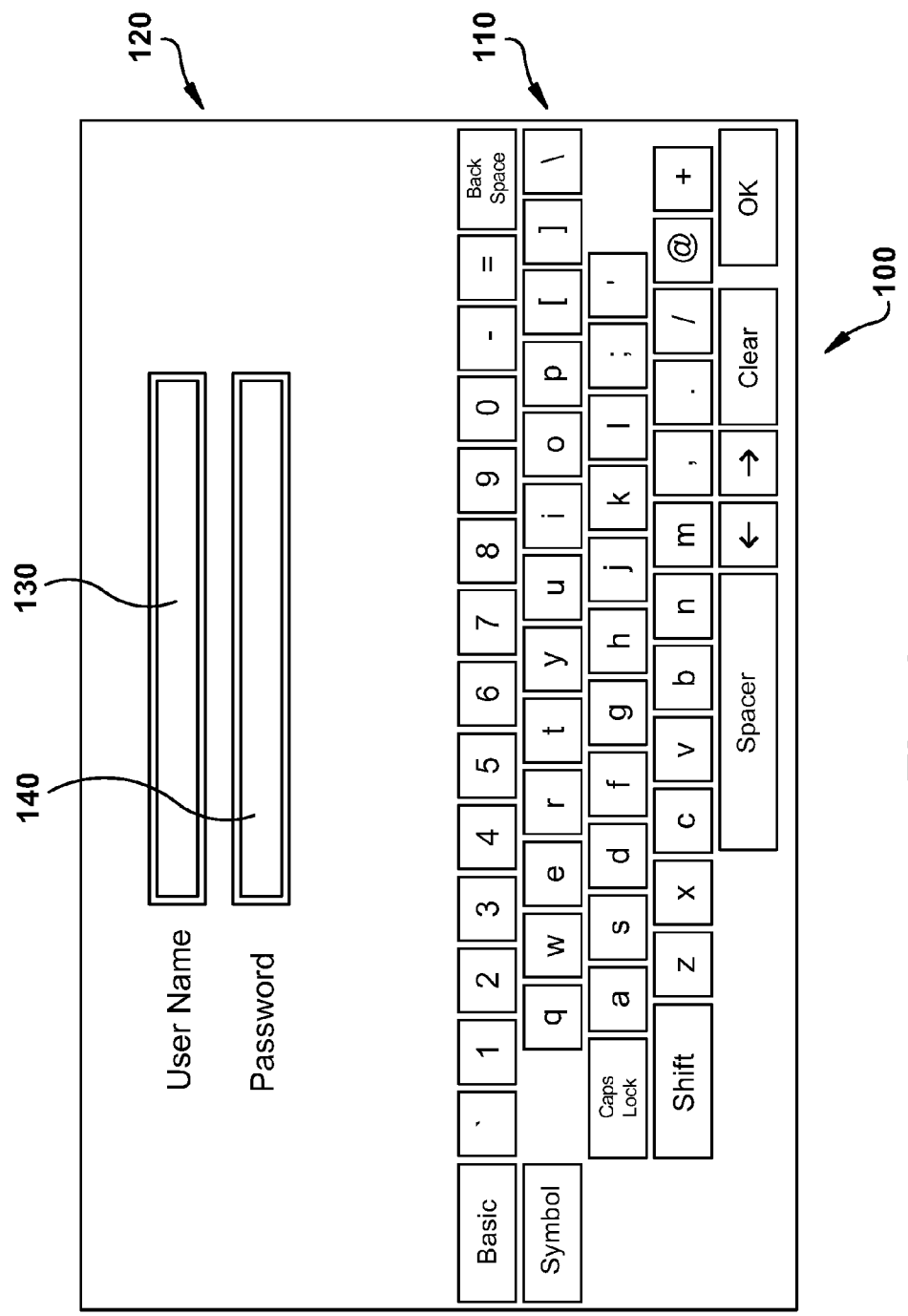
FIG. 1 an example embodiment of a prior art touchscreen login screen.

Touchscreen screens that employ a virtual keyboard for entry of information such as a username and password, as exemplified by the MFP screen 100 of FIG. 1, can be problematic. MFP touchscreens are generally size constrained. Accordingly, generating a virtual keyboard display area 110 requires generating 59 virtual keys. Additional display area 120 is required for data entry fields, such as user name field 130 and password field 140. A user's finger size may be such that it is difficult, or impossible, for them to accurately select virtual keys for input. Even if a user's fingers were sufficiently sized, there is a significant chance for entry error by errantly selecting a neighboring key to the one desired. In certain cases, longer or manicured nails may make it very difficult for certain individuals to enter characters. In addition to the forgoing, entry of usernames, and passwords of desirable security levels with a larger number of characters, exacerbates chances for a data entry error. In the case of password entry the user may not be aware of a character input error until they try to login with their entered information. The error may also be difficult to determine when security features such as not showing keystroke content on the display during password entry are used. Realizing that a particular MFP may be shared by a large number of users who each must login for every use, considerable losses in machine availability and employee efficiency may be sacrificed.

Figure 2:
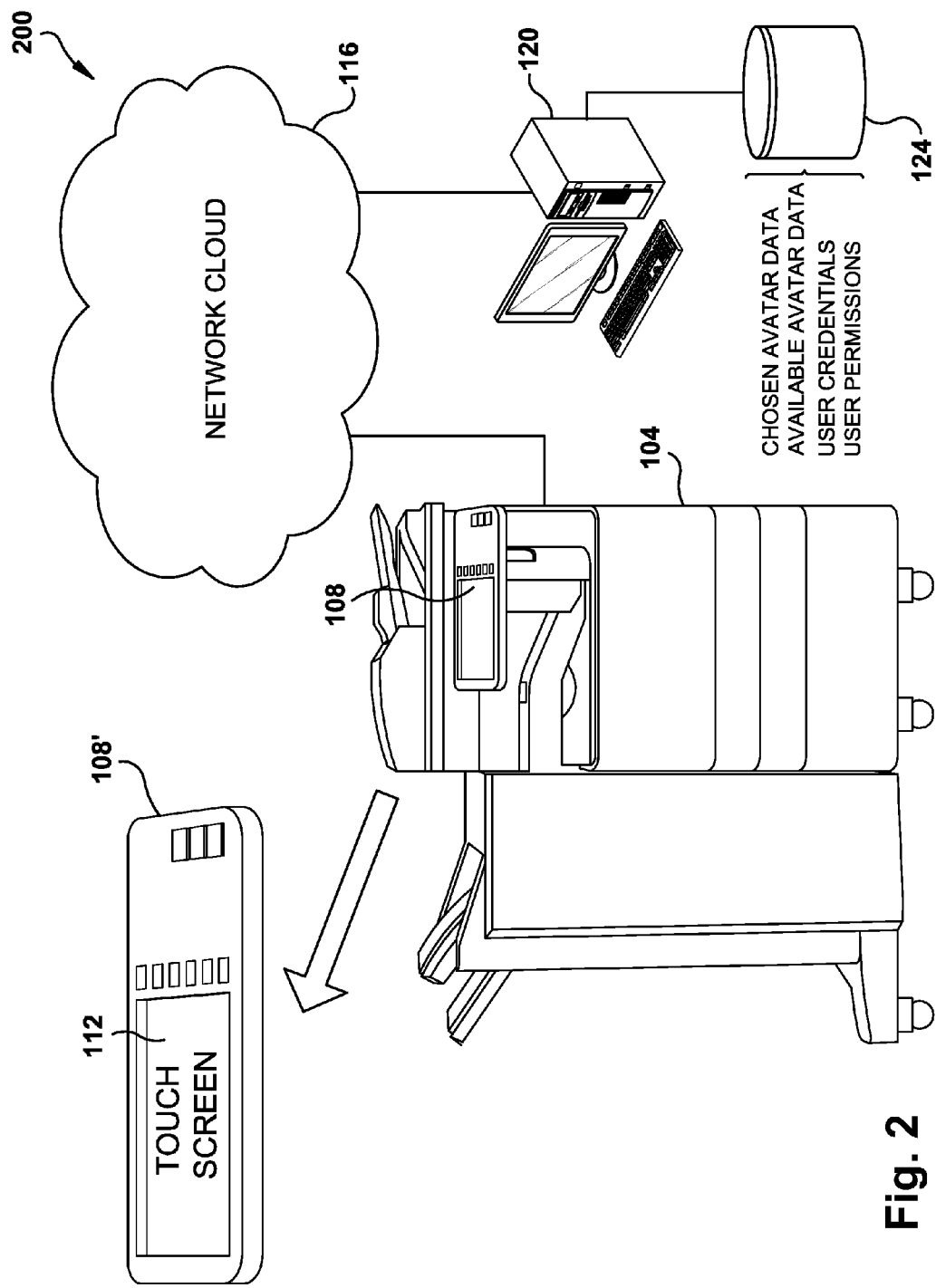
FIG. 2 is an example embodiment of an image based document processing login system.

In accordance with the subject application, FIG. 2 illustrates an example embodiment of an image based document processing login system 200. Included is MFP 104 that includes a user interface 108, illustrated as magnified at 108', that comprises a touchscreen display 112, such as an LED, LCD, OLED or any other suitable touchscreen display. MFP 104 is connected to network cloud 116, suitably comprised of a local area network, wide area network (WAN), which may include the Internet, or any suitable combination thereof. Administrative computer 120 is also connected to network 116 and includes data storage 124. Data storage 124 suitably holds administrative data.

Man-machine device interaction may include use of visual indicia. This indicia include: icons, comprising a graphic symbol on a computer display screen that represents an object (as a file) or function (as the command to delete); avatars, comprising an electronic image that represents and is manipulated by a computer user in a virtual space (as in a computer game or an online shopping site) and that interacts with other objects in the space; and more recently, emojis, comprising any of various small images, symbols, or icons used in text fields in electronic communication (as in text messages, e-mail, and social media) to express the emotional attitude of the writer, convey information succinctly, communicate a message playfully without using words, etc. As used herein, "avatar" may comprise any of the forgoing, or any suitable identifiable and selectable touchscreen graphic rendering. In certain example embodiments, avatars having personal human likeness attributes, such as a person's photo from a company employee data repository which is available on or accessible to an administrative computer, may be desirable. This may sacrifice user anonymity while simultaneously providing information on who may be authorized to use an MFP at any given time.

Data storage 124 includes data corresponding to a plurality of avatars, some of which may be previously associated with a user and some of which may await user association. Also included is user credential data and user permissions for MFP operation if needed. Having such data housed in a networked device such as administrative computer 120 and data storage 124 may be advantageous, particularly in systems wherein users may use one or more of several or many networked MFPs that each require login. It will be appreciated that the functions of administrative computer 124 may be incorporated into the device controller of one or more MFPS, for individual device login control or for one or more MFPs who share in the role of an administrative computer.

Figure 3:
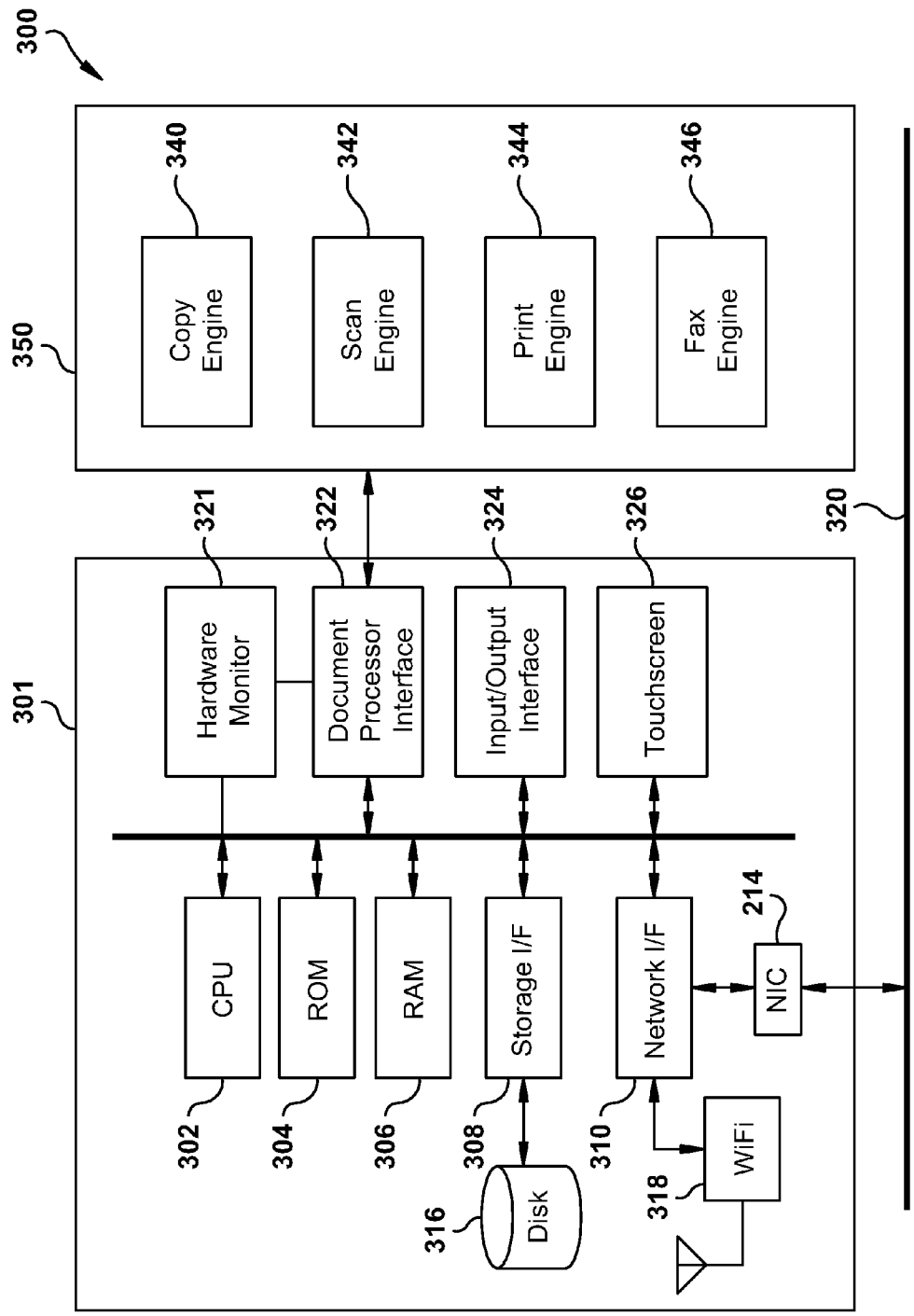
FIG. 3 is an example embodiment of a document rendering system.

Turning now to FIG. 3, illustrated is an example embodiment of a document rendering system 300 suitably comprised within an MFP, such as with MFP 104 of FIG. 2. Included is controller 301 comprised of one or more processors, such as that illustrated by processor 302. Each processor is suitably associated with non-volatile memory such as ROM 304, and random access memory (RAM) 306, via a data bus 312.

Processor 302 is also in data communication with a storage interface 308 for reading or writing to a storage 316, suitably comprised of a hard disk, optical disk, solid-state disk, cloud-based storage, or any other suitable data storage as will be appreciated by one of ordinary skill in the art.

Processor 302 is also in data communication with a network interface 310 which provides an interface to a network interface controller (NIC) 314, which in turn provides a data path to any suitable wired or physical network connection 320, or to a wireless data connection via wireless network interface 318. Example wireless connections include cellular, Wi-Fi, Bluetooth, NFC, wireless universal serial bus (wireless USB), satellite, and the like. Example wired interfaces include Ethernet, USB, IEEE 1394 (FireWire), Apple Lightning, telephone line, or the like.

Processor 302 can also be in data communication with any suitable user input/output (I/O) interface 324 which provides data communication with user peripherals, such as displays, keyboards, mice, track balls, touchscreens, or the like as exemplified by touchscreen 326. Hardware monitor 321 suitably provides device event data, working in concert with suitably monitoring systems. By way of further example, monitoring systems may include page counters, sensor output, such as consumable level sensors, temperature sensors, power quality sensors, device error sensors, door open sensors, and the like. Data is suitably stored in one or more device logs, such as in storage 316.

Also in data communication with data bus 312 is a document processor interface 322 suitable for data communication with MFP functional units 350. In the illustrated example, these units include copy engine 340, scan hardware 342, print engine 344 and fax engine 346 which together comprise MFP functional hardware 350. It will be understood that functional units are suitably comprised of intelligent units, including any suitable hardware or software platform.

Figure 4:
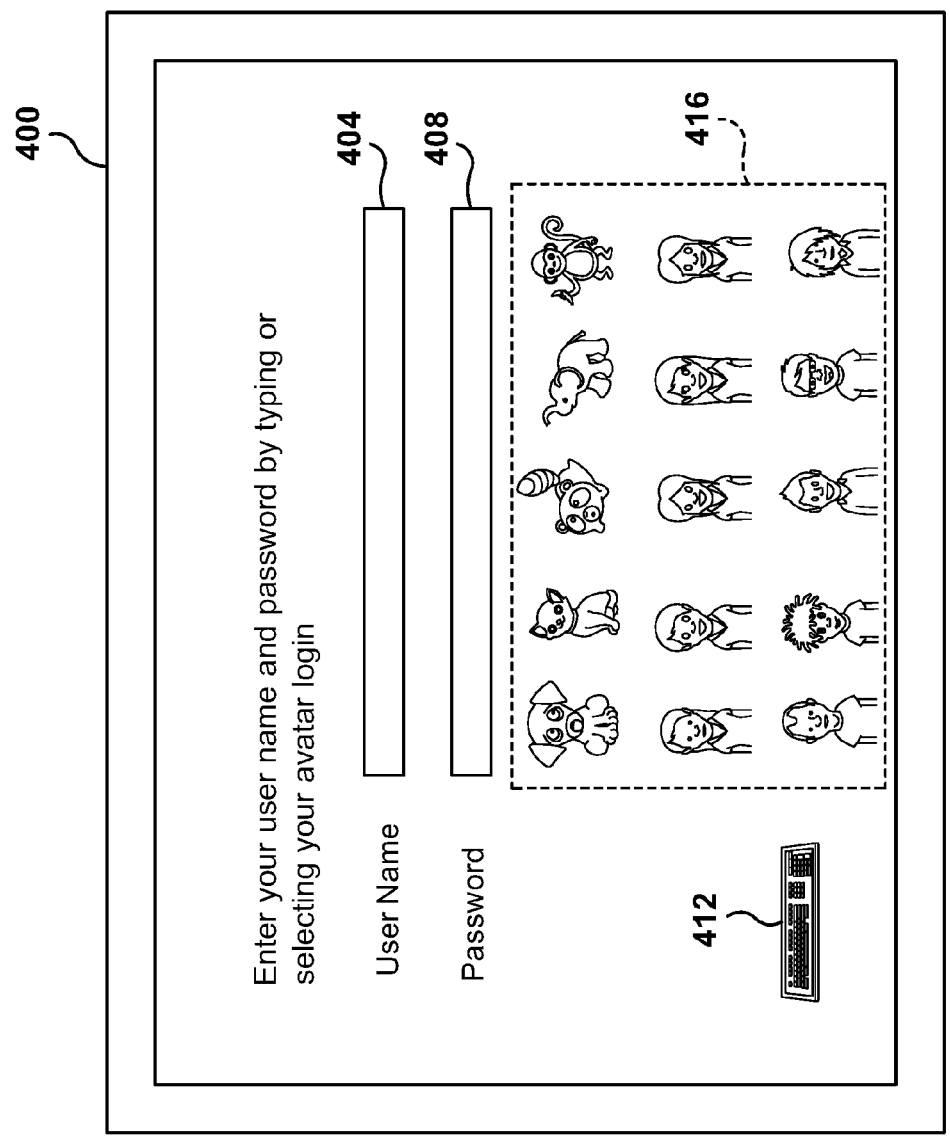
FIG. 4 is an example embodiment of a login screen.

Referring now to FIG. 4, illustrated is an example embodiment of an MFP touchscreen login screen 400, suitably replacing login screens such as that of FIG. 1. Field 404 is provided for text input of user name and field 408 is provided for text entry of a password. To login conventionally, a user may select keyboard icon 412 to bring up a conventional login screen such as that of FIG. 1. Login display 400 also includes an avatar area 416 listing avatars that have been previously claimed and associated with other users as will be detailed further below. In the example of FIG. 4, 15 avatars are available for selection by device users. Fewer or more avatars are suitably used by removing avatars from the display, or adding a scroll bar to avatar area 416. Once an avatar has been claimed by and associated with a user, as further defined below, that user may select the avatar with a single finger tap, rather than enter their text username in field 404. Further personalized security measures have been added to each claimed avatar as will be detailed below to prevent accidental or intentional selection of someone else's avatar for login.

Figure 5:
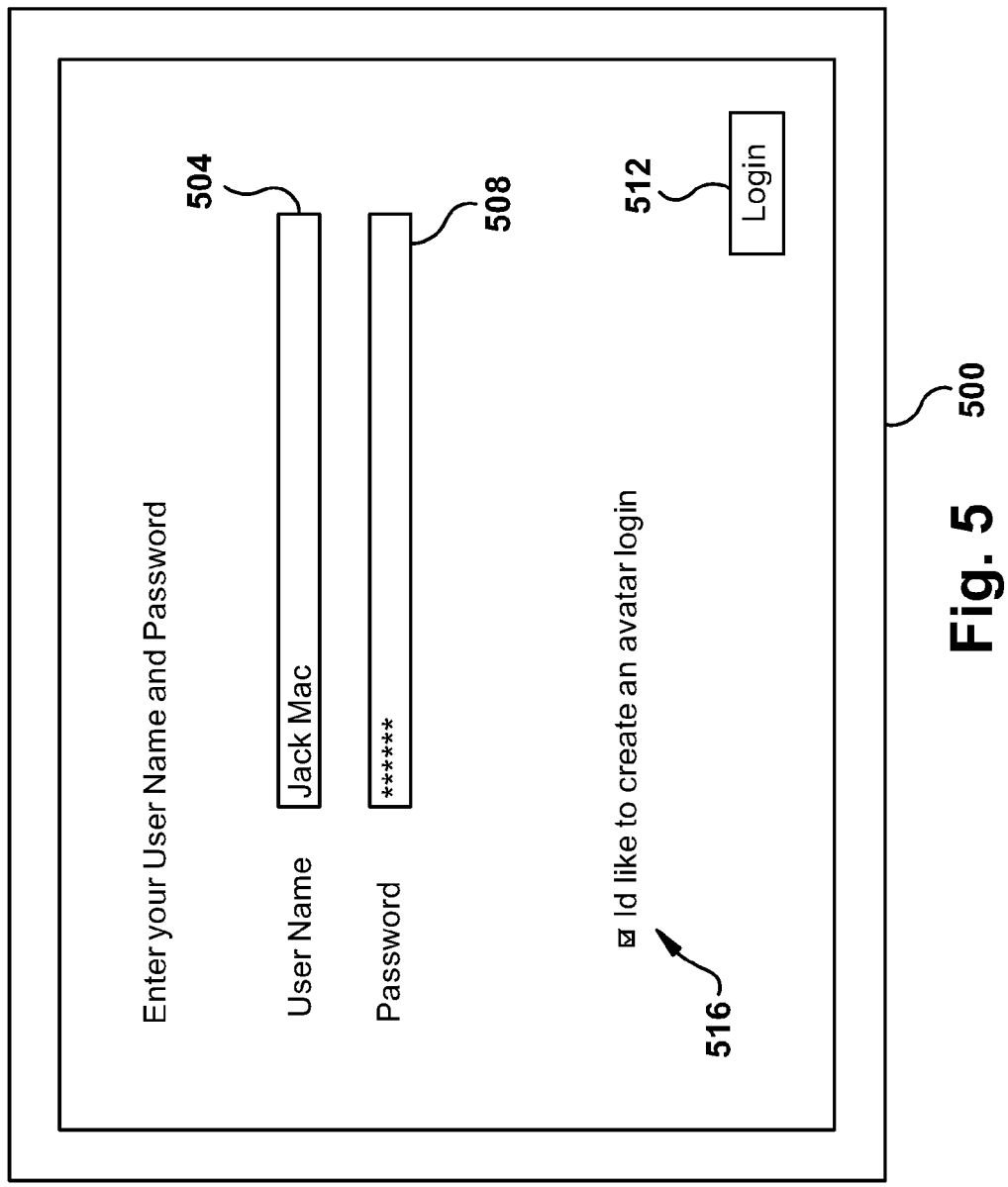
FIG. 5 is an example embodiment of a login screen.

FIG. 5 shows an example embodiment of login screen 500 which may follow screens such as illustrated in the example embodiment of FIG. 4 once a user enters their username and password via a virtual keyboard. The keyed in user information appears in fields 504 and 508. The user may simply continue to login by selecting the login button 512. The user may also select to use avatar-based logins for future sessions by selecting a corresponding option 516, suitably by checking an associated box prior to selecting login button 512.

Figure 6:
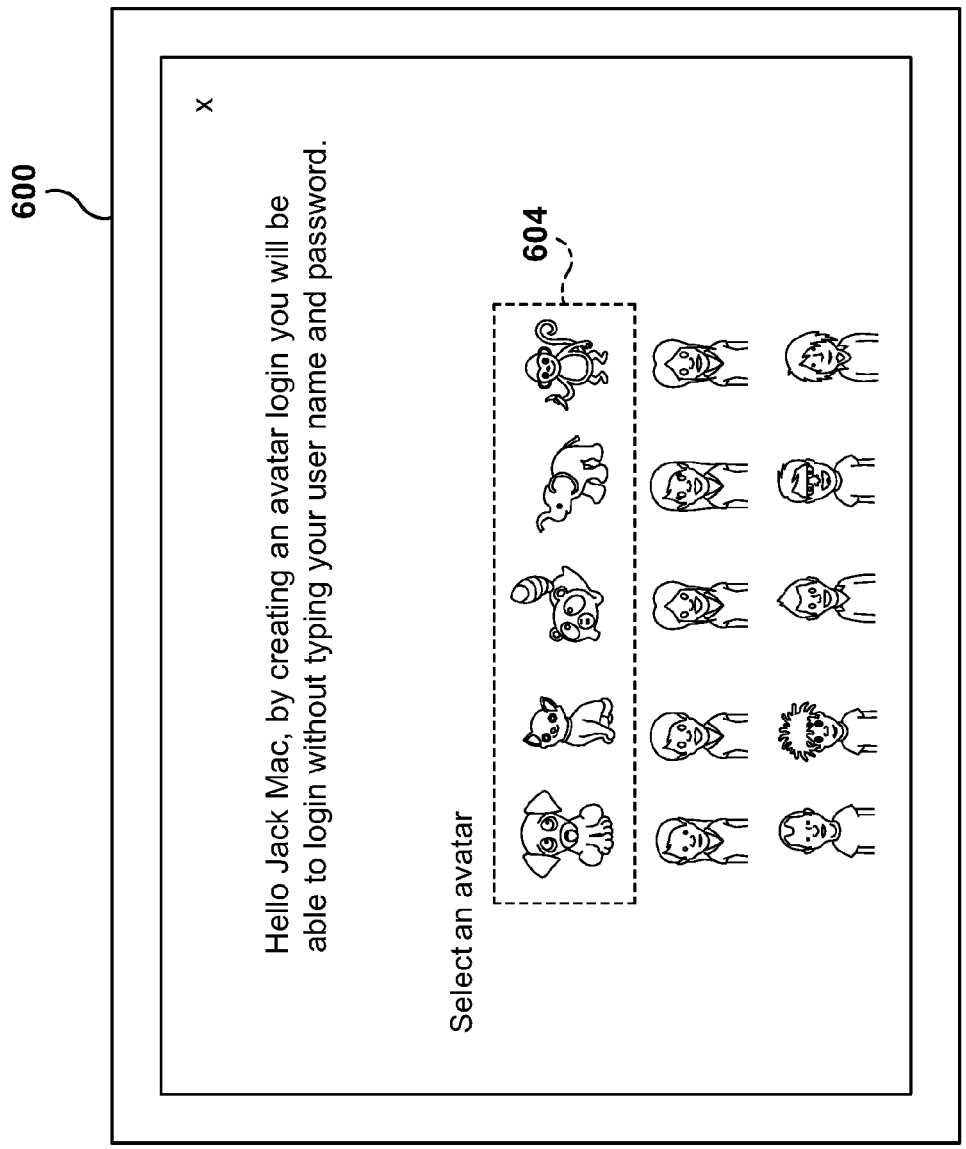
FIG. 6 is an example embodiment of a selection screen.

Turning next to FIG. 6, illustrated is an example embodiment of avatar selection screen 600 following from a user choice to select an avatar. In the illustrated example, a subset 604 of avatars, may be used to indicate which avatars are available as not having been claimed by other users. Alternatively, only available avatars may be shown or a message may appear if an attempt is made to claim someone else's avatar.

Figure 7:
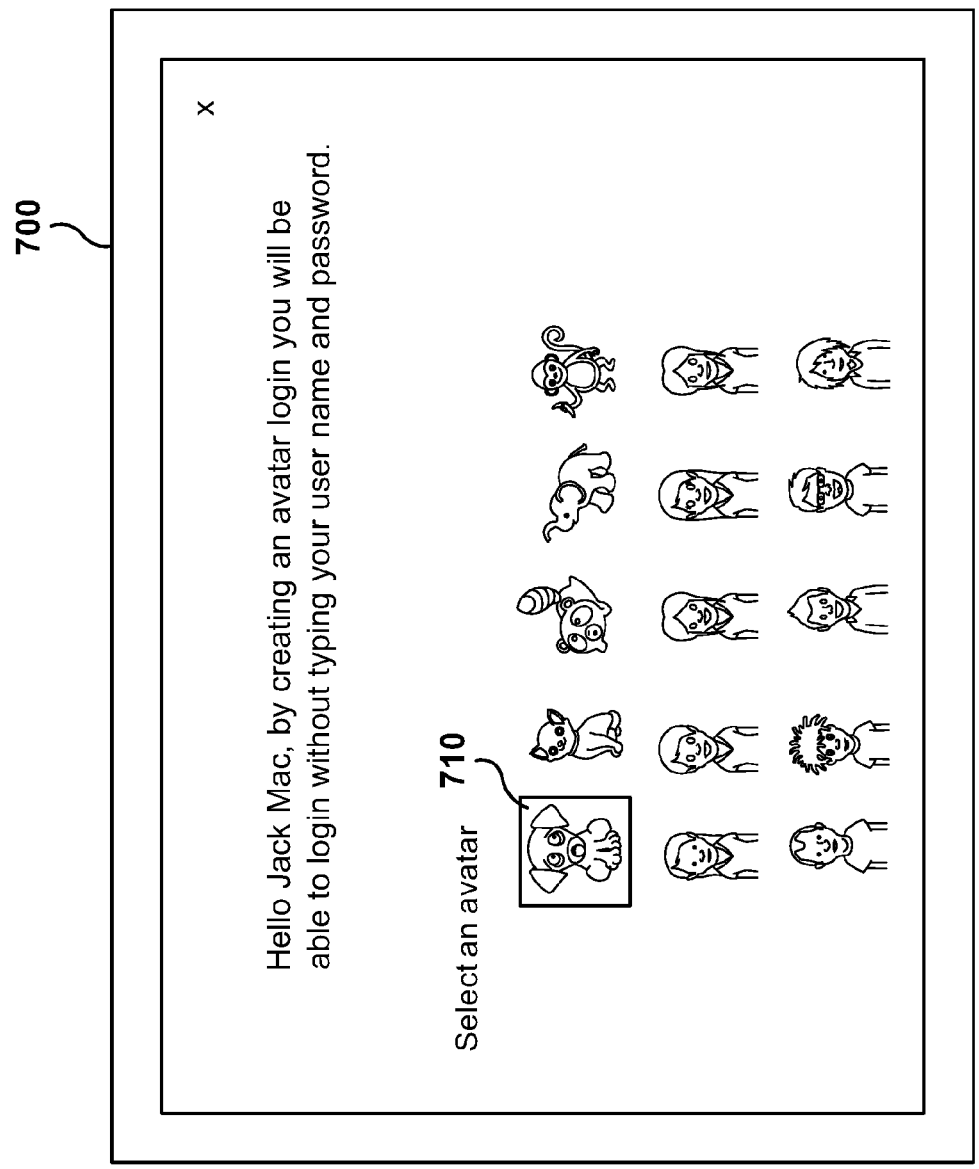
FIG. 7 is an example embodiment of an avatar selection.

FIG. 7 illustrates an example embodiment of avatar selection screen 700 wherein puppy avatar 710 is selected by a user, suitably by touching the puppy avatar 710 on the touchscreen interface.

Figure 8:
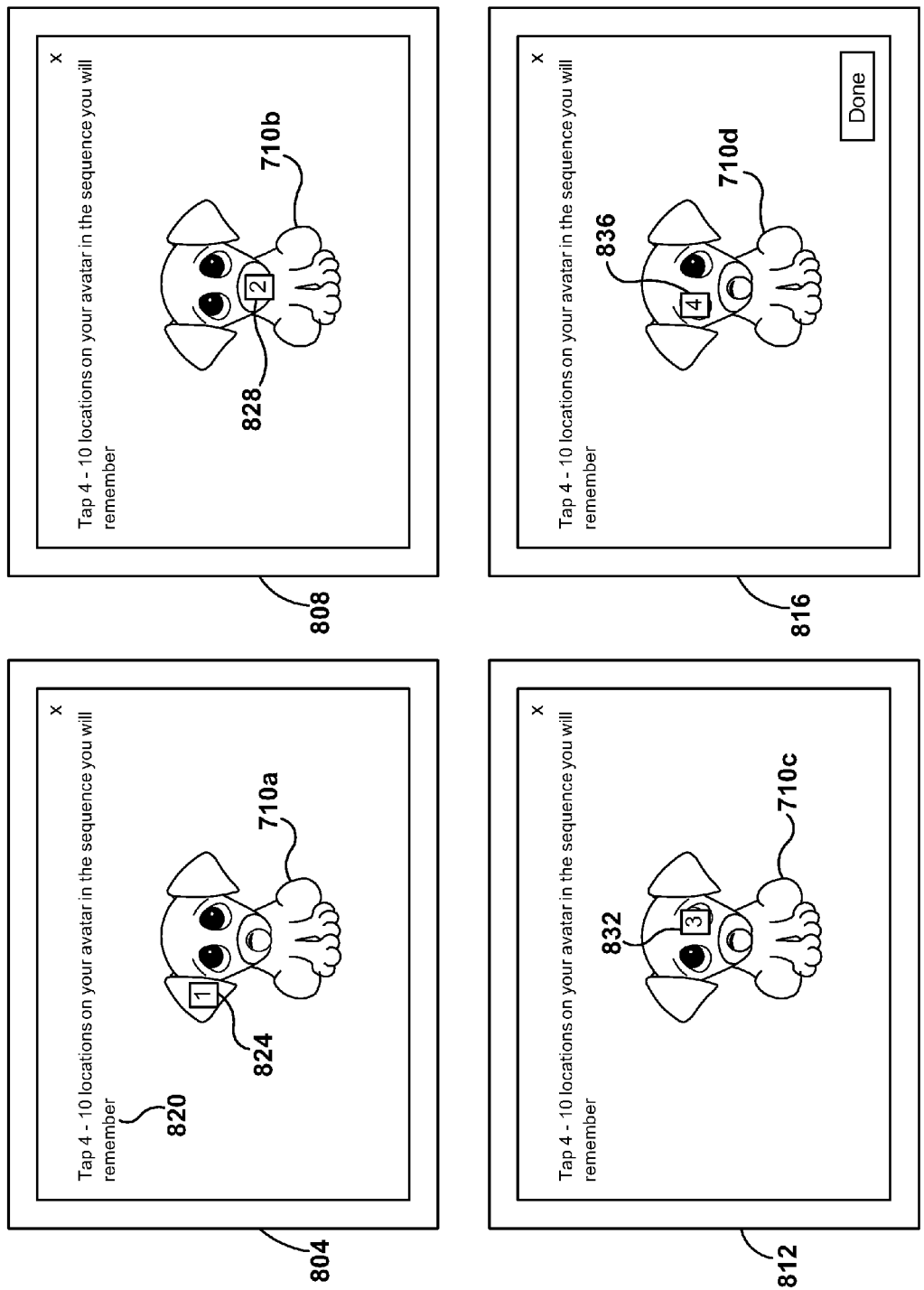
FIG. 8 is an example embodiment of avatar customization.

FIG. 8 illustrates an example embodiment of avatar customization with unique avatar related gesture information selected by a user and associated with their avatar. A sequence of screens 804, 808, 812 and 816 correspond to avatar 710 selected above, illustrated as 710a, 710b, 710c and 710d in corresponding order. The user, pursuant to prompt 820, inputs gesture information to be associated with their avatar. In the illustrated example, four touch points chosen on the avatar are used as illustrated by a first touch point 824, a second touch point 828, a third touch point 832 and a fourth touch point 836. It will be appreciated that any number of touch points may be selected, or required, for an avatar with more touch points resulting in a higher level of security. As will be detailed below, when a user is associated with an icon and selects that icon for login, the user must recall their touch point selections, in order, and touch the corresponding locations on their avatar to complete MFP login. Thus, gestures such as touchpoints can replace for a user's password.

While avatar touch points were used in the example above, it is to be understood that any suitable gesture or gestures, alone or in combination or sequence, may be used. By way of further example, gestures may comprise taps, double taps, swipes, pinches, pressing over time, or the like. As used herein, "tap point" comprises one or more of such gestures, and may include a sequence of gestures.

Figure 9:
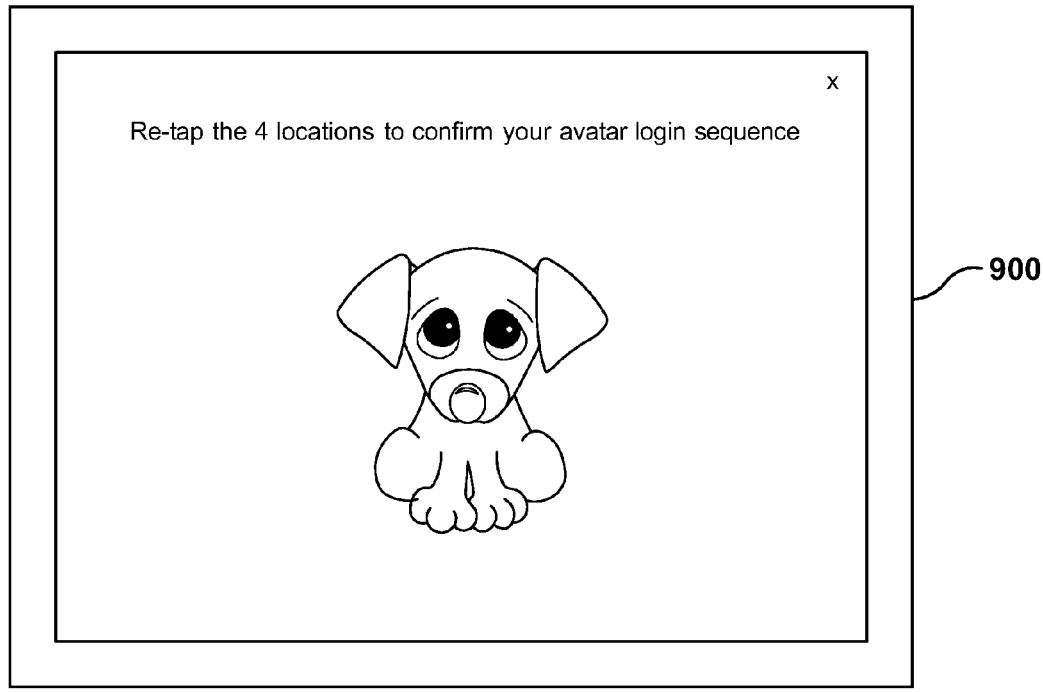
FIG. 9 is an example embodiment of a user selection verification screen.
Figure 10:
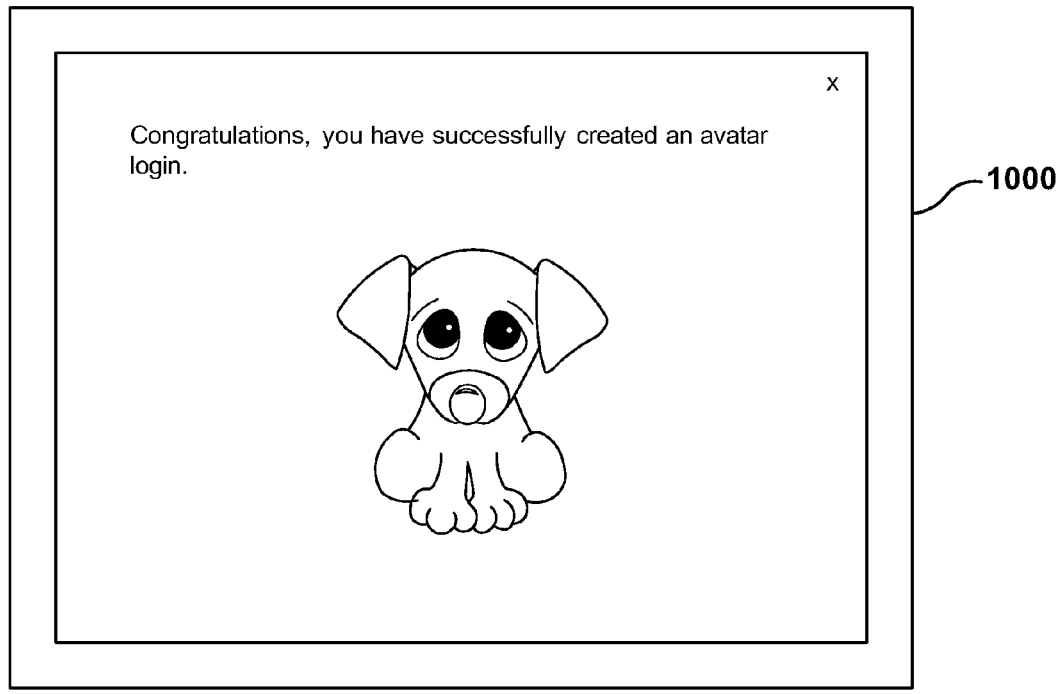
FIG. 10 is an example embodiment of a confirmation screen.

FIG. 9 illustrates an example embodiment of screen 900 wherein a user is called on to verify their touch points one or more times for confirmation. Such repetition may also help the user to recall better gestures or sequences they have chosen. FIG. 10 illustrates an example embodiment of screen 1000 which displays once the user confirms their selected gestures.

Figure 11:
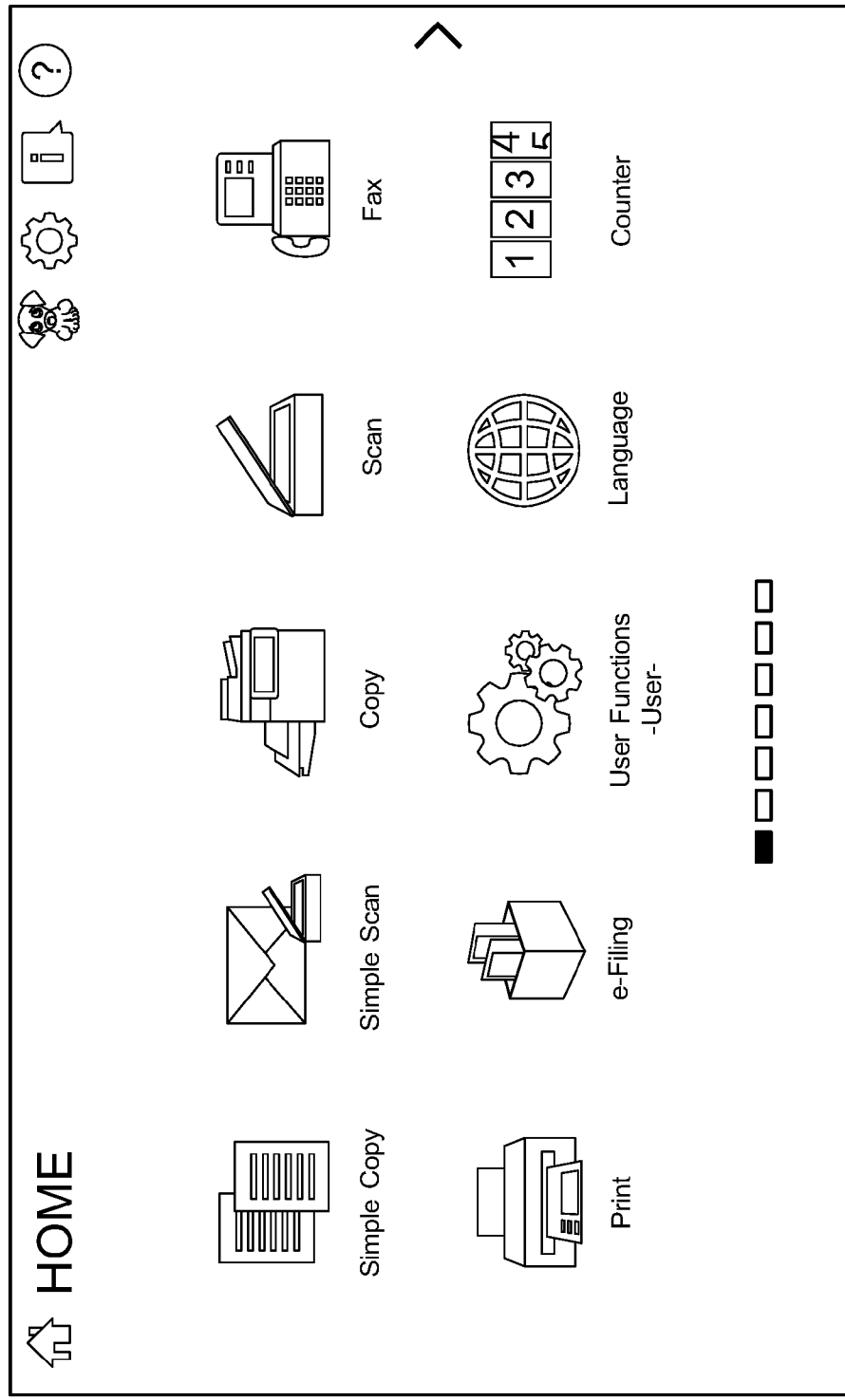
FIG. 11 is an example embodiment of a MFP operation screen for a logged in user.

FIG. 11 illustrates an example embodiment of screen 1100 such as may be displayed for device operation once a user successfully logs in. In a further example, screen 1100 may be customized for different users such that logging in with their avatar will automatically bring up that user's interface.

Figure 12:
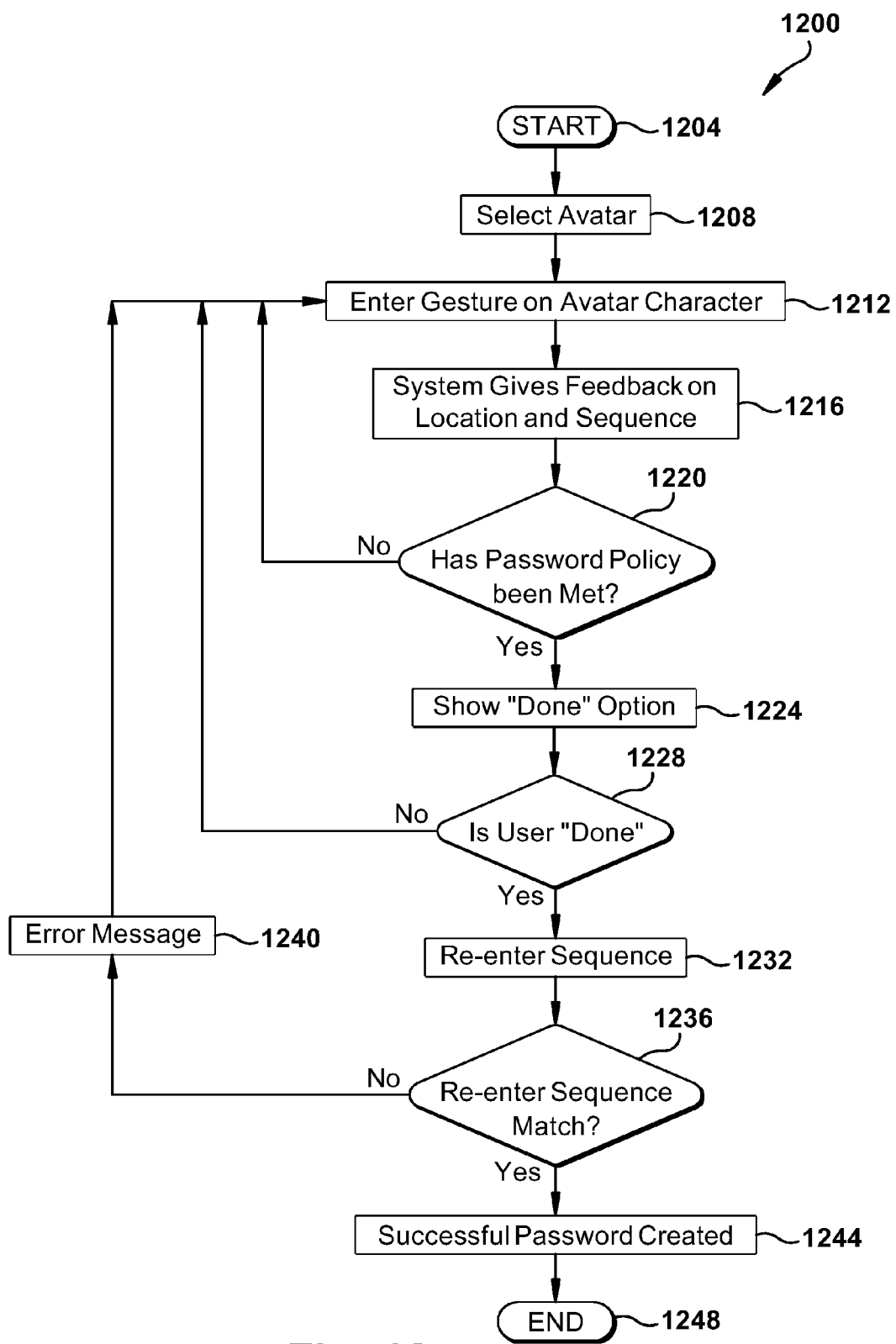
FIG. 12 is a flowchart of an example embodiment for avatar selection.

FIG. 12 illustrates a flowchart 1200 of an example embodiment for avatar selection and customization. The process commences at block 1204 and proceeds to block 1208 where the user selects their desired avatar. The user commences gesture entry at block 1212. The system gives feedback on location and sequence options at block 1216, and user entered gesture information is checked for acceptability at block 1220. If unacceptable, such as by company policy standards, replacement gesture data is suitably obtained by returning to block 1212. If the gestures are acceptable, a user prompt is presented at block 1224, and the user can select the prompt to indicate that the user has completed entering gestures. If the user does not select the prompt at 1228, the process returns to block 1212 to receive more gestures. If the user has selected the user prompt to indicate that they are done at block 1228, then the user is prompted to re-enter the sequence of gestures at block 1232 and the process proceeds to block 1232 for confirmation that the gestures match sufficiently. If not, the user is presented with a suitable error message at block 1240 and the user can recommence gesture entry at block 1212. Once the sequences are confirmed to match, the user has created a successful avatar based login at block 1244 and the process ends at block 1248.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A documents processing system comprising:
    a document processing device controller including a processor and associated memory configured to control operation of a scan engine and a print engine of a multifunction peripheral; and
    a touchscreen configured to receive touch-based user input and display digital image data in accordance with operation of a processor included in the controller,
    wherein the memory is configured to store avatar data for each of a plurality of avatars, the avatar data for each avatar including,
        image data configured to generate an image of an avatar on the touchscreen, and
        image area data corresponding to a plurality of identifiable areas within the avatar when displayed on the touchscreen,
    wherein the processor is further configured to generate, on the touchscreen, a login screen including images of a plurality of avatars from stored avatar data retrieved from the memory,
    wherein the processor is further configured to receive user selection data corresponding to a user-selected avatar,
    wherein the processor is further configured to generate, on the touchscreen, a login image of a selected avatar,
    wherein the processor is further configured to receive, from the touchscreen, tap point data corresponding to a plurality of user touches on the login image of the selected avatar relative to a touchscreen location of the avatar,
    wherein the processor is further configured to compare received tap point data with stored tap point data stored in the memory associatively with the selected avatar, and
    wherein the processor is further configured to selectively enable device operation in accordance with a comparison of the received tap point data with the stored tap point data.

2. The document processing system of claim 1
wherein the processor is further configured to generate, on the touchscreen, images of a plurality of avatars that are available for user association,
wherein the processor is further configured to receive selection data corresponding to a chosen avatar of the plurality of avatars,
wherein the processor is further configured to generate, on the touchscreen, an image of the chosen avatar,
wherein the processor is further configured to receive, via the touchscreen, tap point set data corresponding to a plurality of touch points within the image of the chosen avatar, and
wherein the processor is further configured to store received tap point set data in the memory associatively with avatar data comprising the image of the chosen avatar as stored tap point data.

3. The document processing system of claim 2 wherein the processor is further configured to generate, on the touchscreen, an enlarged image of the selected avatar wherein the received tap data corresponds to the enlarged image.

4. The document processing system of claim 3
wherein the processor is further configured to receive user identification data corresponding to an identity of the user, and
wherein the processor is further configured to store received user identification data associatively with avatar data of the selected avatar.

5. The document processing system of claim 4
wherein the processor is further configured to retrieve user device permission data corresponding to received identification data, and
wherein the processor is further configured to selectively enable operation of at least one scan engine or the print engine in accordance with retrieved device permission data.

6. The document processing system of claim 5 wherein the processor is further configured to login the user to the document processing device in accordance with the comparison of the received tap point data with the stored tap point data, and
wherein the processor is further configured to generate a device operation screen on the touchscreen including a plurality of device operation icons for the user when logged in.

7. The document processing device of claim 6 wherein the processor is further configured to generate the device operation screen as custom device operation screen associated with the logged in user.

8. A method system comprising:
controlling, via a processor and memory of a document processing device controller, operation of a scan engine and a print engine of a multifunction peripheral;
receiving, via a touch screen, touch-based user input;
displaying digital image data in accordance with operation of a processor included in the controller;
storing, in a memory, avatar data for each of a plurality of avatars, the avatar data for each avatar including,
image data configured to generate an image of an avatar on the touchscreen, and
image area data corresponding to a plurality of identifiable areas within the avatar when displayed on the touchscreen;
generating, on the touchscreen, a login screen including images of a plurality of avatars from stored avatar data retrieved from the memory;
receiving user selection data corresponding to a user-selected avatar;
generating, on the touchscreen, a login image of a selected avatar;
receiving, from the touchscreen, tap point data corresponding to a plurality of user touches on the login image of the selected avatar relative to a touchscreen location of the avatar;
comparing received tap point data with stored tap point data stored in the memory associatively with the selected avatar; and
selectively enabling device operation in accordance with a comparison of the received tap point data with the stored tap point data.

9. The method of claim 8 further comprising:
generating, on the touchscreen, images of a plurality of avatars that are available for user association;
receiving selection data corresponding to a chosen avatar of the plurality of avatars;
generating, on the touchscreen, an image of the chosen avatar;
receiving, via the touchscreen, tap point set data corresponding to a plurality of touch points within the image of the chosen avatar; and
storing received tap point set data in the memory associatively with avatar data comprising the image of the chosen avatar as stored tap point data.

10. The method of claim 9 further comprising generating, on the touchscreen, an enlarged image of the selected avatar wherein the received tap data corresponds to the enlarged image.

11. The method of claim 10 further comprising:
receiving user identification data corresponding to an identity of the user; and
storing received user identification data associatively with avatar data of the selected avatar.

12. The method of claim 11 further comprising:
retrieving user device permission data corresponding to received identification data; and
selectively enabling operation of at least one scan engine or the print engine in accordance with retrieved device permission data.

13. The method of claim 12 further comprising:
logging in the user to the document processing device in accordance with the comparison of the received tap point data with the stored tap point data; and
generating a device operation screen on the touchscreen including a plurality of device operation avatars for the user when logged in.

14. The method of claim 13 further comprising generating the device operation screen as custom device operation screen associated with the logged in user.

15. A device comprising:
a network interface in data communication with a plurality of MFPs;
a memory configured to store avatar data corresponding to each of a plurality of avatars, the stored avatar data for each avatar including,
an avatar identifier,
image data for generation of an avatar image on a touchscreen of a networked MFP,
touch point data corresponding to at least one touch point on a rendered image of the avatar selected by an associated user, and
user credential data corresponding to the associated user; and a processor configured for selectively sending a login request approval to the networked MFP via the network interface in accordance with a comparison of the login request with stored avatar data, wherein the network interface is configured to receive a login request from a user of a networked MFP, the login request including, an avatar designator and associated touch point input data.

16. The device of claim 15 wherein the processor is further configured to compare an avatar designator of a login request with stored avatar data, wherein the processor is further configured to associate user identification data in the login request with the avatar designator of the login request when a comparison of the avatar designator of the login request with the stored avatar data indicates that an avatar corresponding to the identification data in the login request is available for user association, and wherein the processor is further configured to associate touch point data in the login request with the avatar designator of the login request when the avatar corresponding to the identification data in the login request is available for user association.

17. The device of claim 16 wherein the processor is further configured to communicate image data for a plurality of the stored avatars to the MFP via the network interface.

18. The device of claim 17 wherein the processor is further configured to communicate image data for a plurality of the stored avatars unavailable for user association to the MFP via the network interface.

19. The device of claim 18 wherein the processor is further configured to communicate image data for a plurality of the stored avatars available for user association to the MFP via the network interface.

20. The device of claim 19 wherein the processor is further configured to associate user identification data of the login request with the avatar designator of the login request when the avatar corresponding to the identification data in the login request is available for user association.

* * * * *